(12) United States Patent
Park et al.

(10) Patent No.: US 7,292,089 B2
(45) Date of Patent: Nov. 6, 2007

(54) CHARGE PUMP CIRCUIT WITH NO OUTPUT VOLTAGE LOSS

(75) Inventors: Young-June Park, Seoul (KR); Jong-Shin Shin, Seoul (KR)

(73) Assignee: Seoul National University Industry Foundation, Bongcheon-Dong, Gwanak-Gu, Seoul (KR)

(*) Notice: Subject to any disclaimer, the term of this patent is extended or adjusted under 35 U.S.C. 154(b) by 127 days.

(21) Appl. No.: 11/060,656

(22) Filed: Feb. 18, 2005

(65) Prior Publication Data

US 2005/0264342 A1  Dec. 1, 2005

(30) Foreign Application Priority Data

May 25, 2004  (KR) .................. 10-2004-0037487

(51) Int. Cl.
G05F 3/02  (2006.01)
(52) U.S. Cl. .............. 327/536; 363/59; 363/60
(58) Field of Classification Search ........... 327/536; 363/59, 60
See application file for complete search history.

(56) References Cited

U.S. PATENT DOCUMENTS

| | | | | |
|---|---|---|---|---|
| 5,889,428 A * | 3/1999 | Young | ................ | 327/536 |
| 6,160,723 A * | 12/2000 | Liu | ................ | 363/60 |
| 6,373,324 B2 * | 4/2002 | Li et al. | ................ | 327/536 |
| 6,515,535 B2 * | 2/2003 | Myono | ................ | 327/536 |
| 6,642,773 B2 * | 11/2003 | Lin et al. | ................ | 327/536 |
| 6,677,806 B2 * | 1/2004 | Bloch | ................ | 327/536 |
| 6,864,739 B2 * | 3/2005 | Shor et al. | ................ | 327/536 |
| 6,878,981 B2 * | 4/2005 | Eshel | ................ | 257/299 |
| 7,102,422 B1 * | 9/2006 | Sawada et al. | ................ | 327/536 |

OTHER PUBLICATIONS

Jong-Shin Shin, In-Young Jung, Hong-Sik Min, and Young-June Park, "A New Low Pump Circuit with No Output Voltage Loss by MOSFET $V_T$," The 11th Korean Conference on Semiconductors, Feb. 19-20, 2004, pp. 79-80.

Jong-Shin Shin "A New Charge Pump with No Output Degradation Due to Threshold Voltage," The 11th Korean Conference on Semiconductors in Muju Resort, Feb. 19-20, 2004.

* cited by examiner

*Primary Examiner*—Kenneth B. Wells
(74) *Attorney, Agent, or Firm*—Venable LLP; Michael A. Sartori; Marina V. Zalevsky

(57) ABSTRACT

The present invention is for preventing a charge pump from an unnecessary output voltage loss generated by a threshold voltage of a metal-oxide silicon (MOS) transistor. An apparatus for amplifying an inputted voltage includes an amplifying block including at least two pumping units for amplifying the inputted voltage to generate an output voltage; and at least two pumping capacitors, each coupled between two pumping units for supplying a charge in order to amplifying the output voltage of each pumping unit, wherein the pumping unit has a transferring block for transmitting the inputted voltage; and an activation block for activating the transferring block.

15 Claims, 5 Drawing Sheets

CHARGE PUMP CIRCUIT WITH NO OUTPUT VOLTAGE LOSS

FIELD OF INVENTION

The present invention relates to a charge pump for generating a high level voltage which is higher than a supply voltage; and, more particularly, to a charge pump for preventing a output voltage loss caused by a threshold voltage of a metal-oxide silicon (MOS) transistor.

DESCRIPTION OF PRIOR ART

Generally, an integrated circuit receives a supply voltage VDD from outside of the integrated circuit; and, for generating a high level voltage which is higher than the supply voltage VDD, the integrated circuit includes a charge pump.

A Dickson charge pump is one of universally used charge pump. FIG. 1 is a block diagram showing a Dickson charge pump.

As shown, the Dickson charge pump includes plural pumping units 10_1 to 10_N and plural capacitor $C_B$, $C_A$, . . . and $C_L$. In detail, each pumping unit has a diode-connected MOS transistor.

However, in the Dickson charge pump, an output voltage at each pumping unit is not sufficiently generated because of the increased threshold voltage of a metal-oxide silicon (MOS) transistor included in each pumping unit. Herein, because of a body-bias effect, the threshold voltage of the MOS transistor is increased. Thus, when the supply voltage VDD is relatively low, the Dickson charge pump can not be used efficiently in the integrated circuit.

For overcoming the above described handicap of the Dickson charge pump, a charge pump in a commonly owned copending application, KR. Ser. No. 10-1999-0027657, filed on Jul. 9, 1999, entitled "CHARGE PUMP", which is incorporated herein by reference, can be utilized.

In the above referenced charge pump, each pumping unit includes a transfer transistor and two additional MOS transistors, each holding its body in common. Each of the two additional MOS transistors connects its body to the source or drain node which has higher voltage than the other.

As a result, though a source voltage of the transfer transistor is increased, the two additional MOS transistors prevent a reverse bias between source and body of the transfer transistor keeping its threshold voltage as a predetermined value. However, a degradation of an output voltage might still occur due to the constant threshold voltage.

The degradation of an output voltage based on a threshold voltage of the transfer transistor is unavoidable although the reverse bias is prevented in the charge pump of the above referenced patent application. Namely, due to the threshold voltage of the transfer transistor, the output voltage is not sufficiently generated especially when the VDD is low.

Though the charge pump should include plural pumping units for obtaining a high level voltage, the charge pump is not efficient enough in a low VDD environment in which the difference between VDD and threshold voltage is small. Also, if a difference between voltage levels of the output voltage and the input voltage in the pumping unit is lower than the threshold voltage, the transfer transistor is inactivated and, then, the charge pumping operation can not be carried out.

In addition, during the charge pumping operation, the transfer transistor has a stray capacitance at its gate. Thus, because of a stray charge accumulated by the stray capacitance, the transfer transistor of the charge pump is not effectively operated.

SUMMARY OF INVENTION

It is, therefore, an object of the present invention to provide a charge pump for generating a high level voltage without any degradation of an output voltage based on a threshold voltage of a MOS transistor inside the charge pump.

It is, therefore, another object of the present invention to provide a charge pump which can eliminate or reduce a stray charge of the MOS transistor included in the charge pump.

In accordance with an aspect of the present invention, there is provided an apparatus for amplifying an inputted voltage, including an amplifying block including at least two pumping units for amplifying the inputted voltage to generate an output voltage; and at least one pumping capacitor, each coupled between two pumping units for supplying a charge in order to amplifying the output voltage of each pumping unit, wherein the pumping unit includes a transferring block for transmitting the inputted voltage and an activation block for activating the transferring block.

BRIEF DESCRIPTION OF THE DRAWINGS

The above and other objects and features of the present invention will become apparent from the following description of preferred embodiments taken in conjunction with the accompanying drawings, in which.

DETAILED DESCRIPTION OF INVENTION

Hereinafter, a semiconductor device having a charge pump for preventing an output voltage loss caused by a threshold voltage of a metal-oxide silicon (MOS) transistor according to the present invention will be described in detail referring to the accompanying drawings.

A charge pump for generating a higher voltage than VDD in accordance with the present invention includes at least two pumping capacitors, each coupled between two pumping units for supplying a charge in order to generating the output voltage of each pumping unit.

The charge pump further includes a capacitor coupled between ground and the last pumping unit for stabilizing the output voltage of the last pumping unit.

Figure 2:
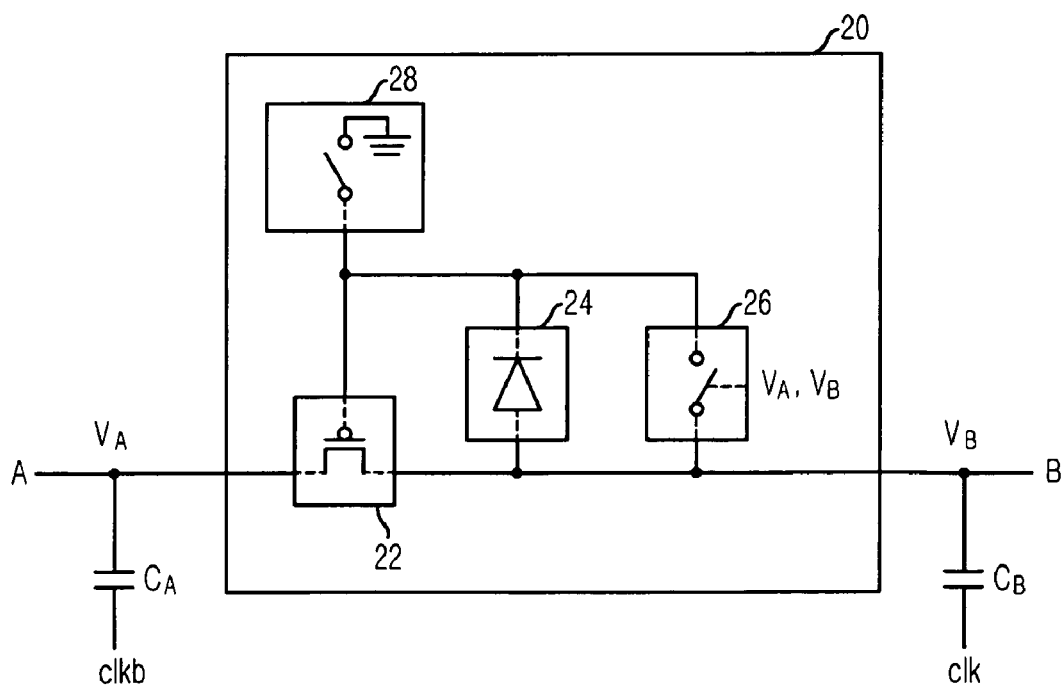
FIG. 2 is a block diagram showing a pumping unit included in a charge pump in accordance with an embodiment of the present invention.

FIG. 2 is a block diagram showing the pumping unit included in the charge pump in accordance with an embodiment of the present invention.

As shown, the pumping unit 20 includes a transferring block 22 for transmitting the inputted voltage; and an activation block for activating the transferring block. In detail, the activation block has a diode block 24, a turn-off block 26 and a discharge block 28.

Furthermore, two pumping capacitors are respectively coupled at an input node A and an output node B of the pumping unit 20. Herein, a first pumping capacitor $C_A$ coupled to the input node A receives an inverse clock signal clkb and a second pumping capacitor $C_B$ coupled to the output node B receives a clock signal clk. Also, though not shown in FIG. 2, the output node B can be considered as an input node of the next pumping unit.

Figure 3:
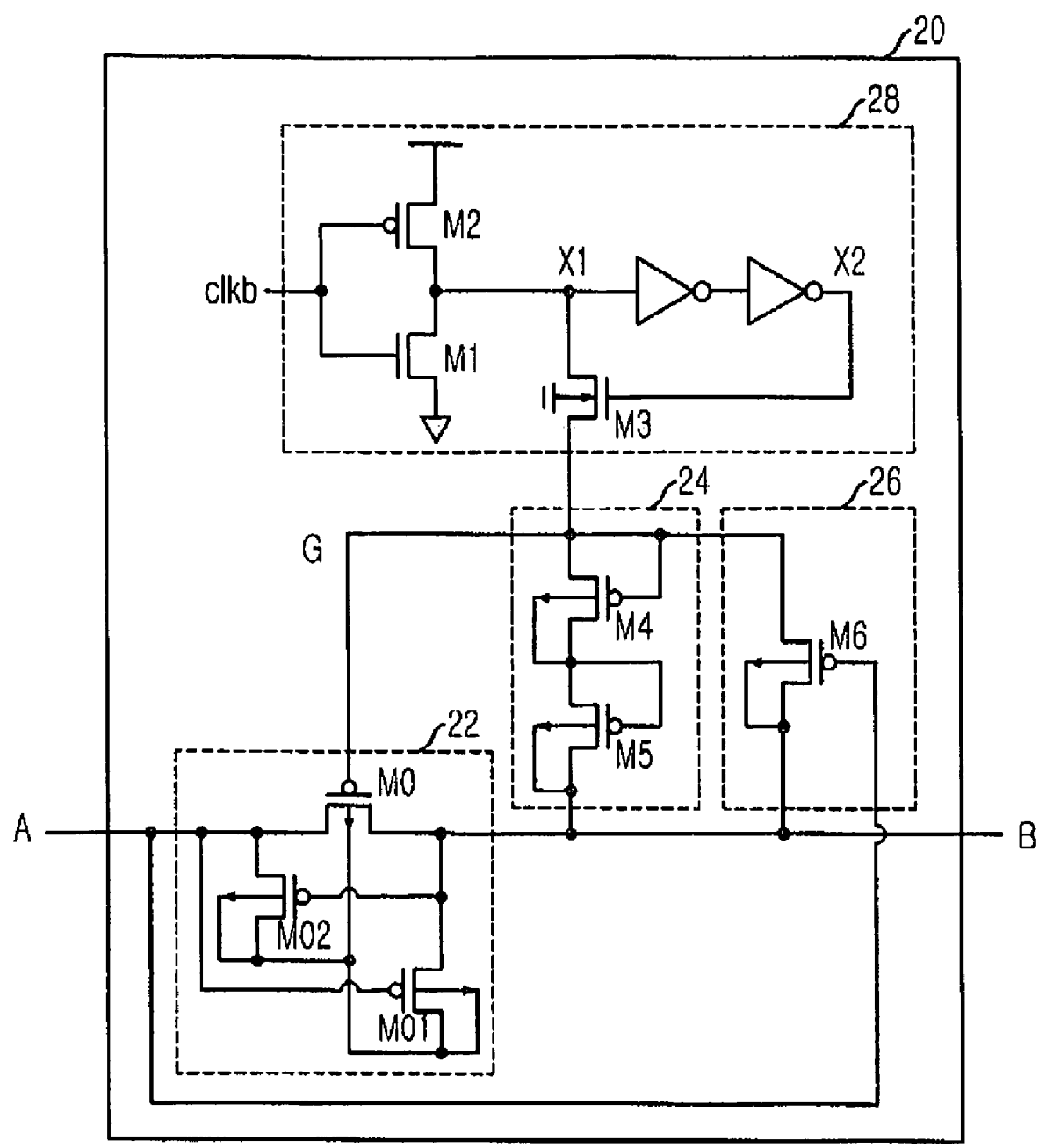
FIG. 3 is a schematic circuit diagram describing the pumping unit shown in FIG. 2.

FIG. 3 is a schematic circuit diagram describing the pumping unit shown in FIG. 2.

As shown, the transferring block 22 includes a transfer transistor and an auxiliary transistor. The transfer transistor M0 receives the inputted voltage and transmits the inputted voltage in response to a voltage difference between a gate and a source of the transfer transistor. The auxiliary transistor includes two PMOS transistors M01 and M02 for preventing a reverse bias between source and body in order to keep the threshold voltage of transfer transistor as a predetermined value.

Because the transferring block is described in a commonly owned copending application, KR. Ser. No. 10-1999-0027657, filed on Jul. 9, 1999, entitled "CHARGE PUMP", which is incorporated herein by reference, detailed description about the transferring block 22 is omitted herein.

As above described, the activation block includes the diode block 24, the turn-off block 26 and a discharge block 28.

The diode block 24 makes the voltage difference between the gate and the source of the transfer transistor M0 higher than a threshold voltage in order to transfer charge from the input node A to the output node B without voltage drop due to threshold voltage.

Herein, the diode block 24 includes at least one diode for decreasing the gate node voltage, i.e., node G. For dropping the gate node voltage by a predetermined value more than the threshold voltage of transfer transistor, the diode block includes two diodes M4 and M5 shown in FIG. 3.

The two diodes M4 and M5 are diode-connected PMOS transistors. Herein, the PMOS transistor is more usually used than an NMOS transistor because the NMOS transistor can generate a latch-up phenomenon.

Thus, because of two diodes which can decrease the voltage level at the gate of the transfer transistor M0 by about twice the threshold voltage, the transfer transistor can be turned on.

The turn-off block 26 is for making a voltage level at the gate of the transfer transistor M0 be equal to a voltage level at the drain (node B) of the transfer transistor M0 in order to inactivate the transferring block 22.

As shown in FIG. 3, the turn-off block 26 includes an equalization transistor M6 having a gate, a source, a drain and a body, wherein the gate is coupled to the input node A, the source is coupled to the gate of the transfer transistor and the drain and the body are coupled to the output node B of the pumping unit 20.

Namely, if a voltage level of the input node A is lower than that of the output node B by about the threshold voltage, the equalization transistor M6 is turned on and, then, the transfer transistor M0 is turned off.

On the contrary, if the voltage level of the input node A is not lower than that of the output node B by about the threshold voltage, the equalization transistor M6 is turned off and a voltage level at the gate of the transfer transistor M0, i.e., node G, is decreased to about twice of the threshold voltage lower than the voltage level of the output node B by the diode block 24. Then, the transfer transistor M0 is turned on.

The activation block of the pumping unit further includes the discharge block 28 is for discharging charge accumulated by a parasitic capacitance of the transfer transistor M0.

In detail, the discharge block 28 includes a bias block, a delay block and a control transistor M3. The bias block is for supplying one of a supply voltage and a ground in response to an inputted signal. Herein, the inputted signal is one of a clock signal and an inverse clock signal. The delay block delays an output of the bias block by a predetermined time. Then, the control transistor M3 coupled to the gate of the transfer transistor M0, i.e., node G, is for discharging the accumulated charge by using the output of the bias block during the predetermined time.

Referring to FIG. 3, the delay block has two serially connected inverters between nodes X1 and X2. Also, the bias block includes two bias transistors M1 and M2. A first bias transistor M2 is a PMOS transistor for transmitting a supply voltage in response to the inputted inverse clock signal clkb; and a second bias transistor M1 is a NMOS transistor for transmitting a ground in response to the inputted inverse clock signal clkb.

In the pumping unit 20 shown in FIG. 3, if the control transistor M3 is turned on, the accumulated charge at the gate of the transfer transistor M0 can be discharged by the second bias transistor M1 during the predetermined time after the inverse clock signal clkb is a logic high state.

Figure 4:
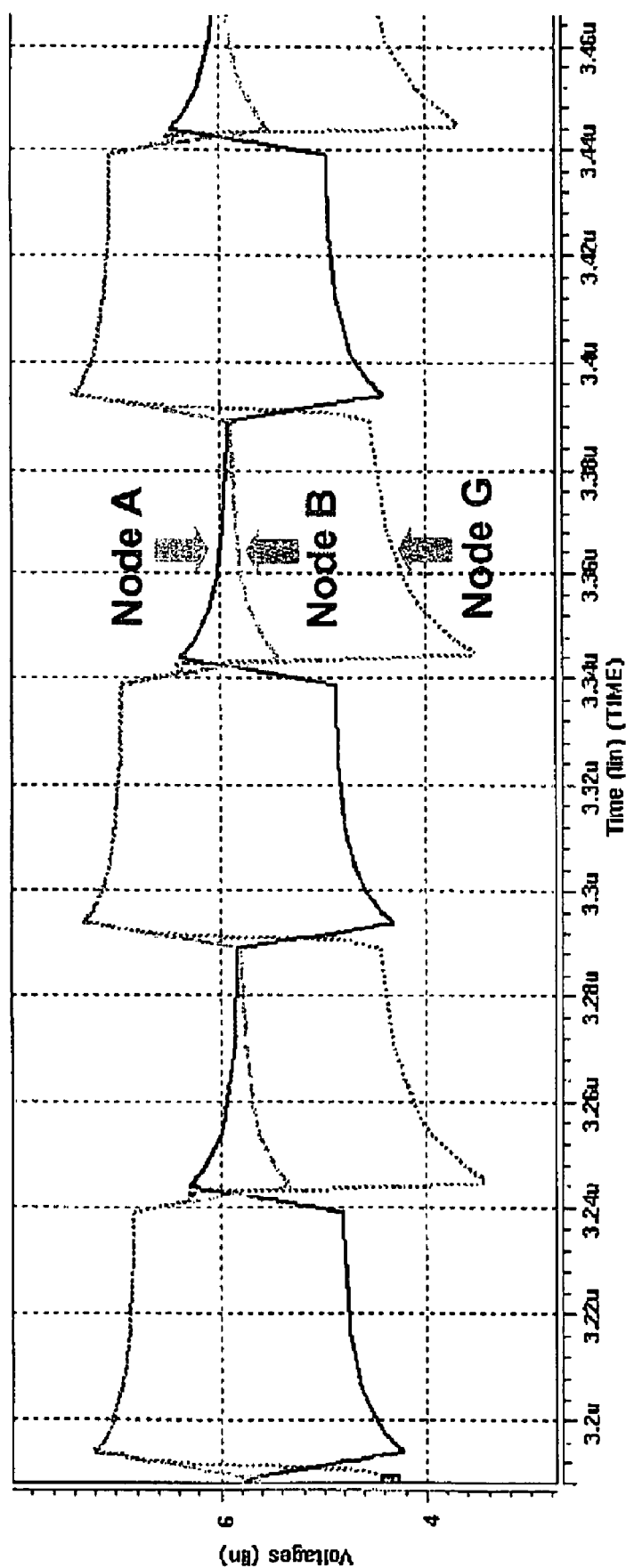
FIG. 4 is a timing diagram depicting an operation of the pumping unit shown in FIG. 2.

FIG. 4 is a timing diagram depicting an operation of the pumping unit shown in FIG. 2. Hereinafter, referring to FIGS. 2 to 4, operation of the charge pump according to the present invention is described in detail.

Figure 1:
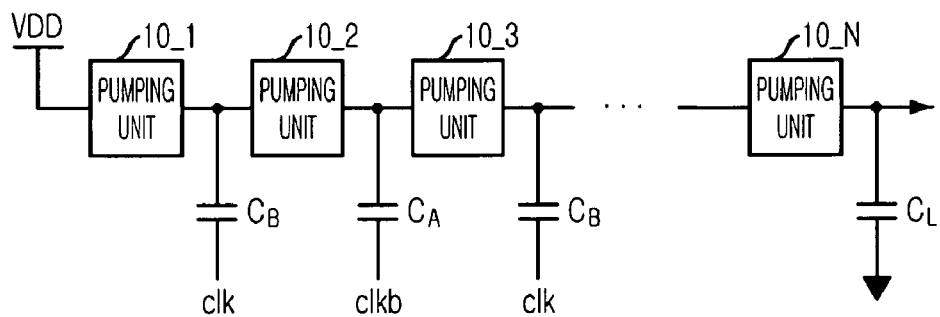
FIG. 1 is a block diagram showing a Dickson charge pump.

Like a conventional charge pump shown in FIG. 1, the pumping capacitors shown in FIG. 2 are respectively coupled to the clock signal and the inverse clock signal.

Referring to FIG. 2, the input node A is coupled to the inverse clock signal clkb via the first pumping capacitor $C_A$; and the output node B is coupled to the clock signal clk via the second pumping capacitor $C_B$.

In addition, the control transistor M3 shown in FIG. 3 has a long channel length in order to prevent a punch through phenomenon.

First, when the clock signal clk is a logic high state, i.e., the inverse clock signal clkb is a logic low state, the equalization transistor M6 is turned on and, as a result, a voltage level at the gate of the transfer transistor M0 is equal to that of the output node B. Then, the transfer transistor M0 is turned off and no charge flows from the input node A to the output node B. In this state, the nodes X1 and X2 both become VDD and the control transistor M3 is also turned off. Thus, no charge flows from the output node B to the ground through the control transistor M3. And then, if the clock signal clk is inputted as a logic low state and the inverse clock signal clkb becomes a logic high, equalization transistor M6 is turned off and the gate of the transfer transistor becomes a high impedance state temporarily.

Since the inverse clock signal clkb becomes a logic high, the node X1 becomes a logic low after one inverter delay. After the transition of the node X1 to a logic low, however, the node X2 is temporary high for two inverter delays. The short turn-on time of the control transistor M3 lets the charges stored in the parasitic capacitor of the transfer transistor flow away through the control transistor M3. Due to the two diode-connected MOSFETS, M4 and M5, the difference between the output node B and gate node cannot surpass $2V_T$. Once the gate voltage is lower than the voltage level of node B by $2V_T$, the gate has a low impedance path to the output node B. Then the gate node moves up with the output node B keeping $2V_T$ difference.

In the present invention, for turning on the transfer transistor M0, the charge pump does not include any additional generator or any external device.

Hereinafter, an operation of the discharge block 28 included in the pumping unit 20 of the charge pump according to the preferred embodiment of the present invention is described in detail.

When the clock signal clk is a logic high state and the inverse clock signal clkb is a logic low state, a first node X1 and a second node X2 shown in FIG. 3 becomes a logic high state, e.g., a supply voltage level VDD. At this time, the control transistor M3 is turned off and, then, any charge is not moved from the gate of the transfer transistor M0, i.e., node G, to the first node X1 of the discharge block 28.

Then, when the clkb rises, the node X1 becomes a logic low but the node X2 is maintained as a logic high state during two inverter delay time. During this time, the control transistor M3 is turned on. As a result, charges accumulated at the gate of the transfer transistor M0 in a parasitic capacitor can be moved to the ground throughout the second bias transistor M1.

Referring to FIG. 4, there is shown a simulation result of the output voltage from the charge pump in response to the the clock signal clk and the inverse clock signal clkb. When a voltage level of the input node A is higher than that of the output node B, a voltage level at the gate of the transfer transistor M0, i.e., node G, is always lower than that of the node B by about twice of the threshold voltage (2Vt); and, as a result, the voltage of the node B can be charged up to the same voltage of the node A.

Figure 5:
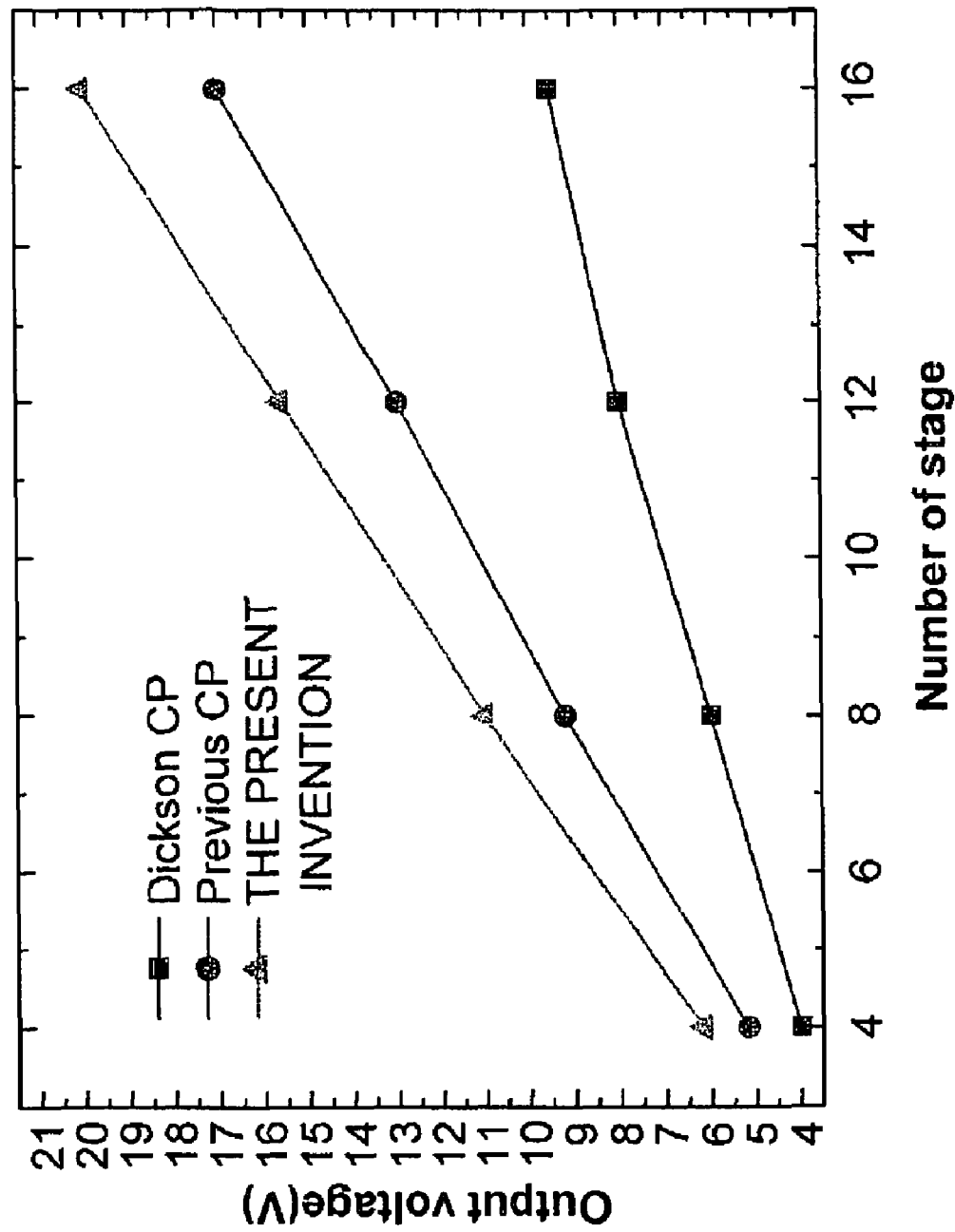
FIG. 5 is a graph describing a pumping capability and a pumping efficiency of the charge pump in accordance with the embodiment of the present invention as compared with a Dickson charge pump and a previous charge pump.

FIG. 5 is a graph describing a pumping capability and a pumping efficiency of the charge pump in accordance with the embodiment of the present invention as compared with a Dickson charge pump and a conventional charge pump. As shown, since the charge pump according to the present invention prevents a voltage drop of the output voltage caused by the threshold voltage, the charge pump can output an output voltage which is higher than output voltages of the Dickson charge pump and the previous conventional charge pump.

Figure 6:
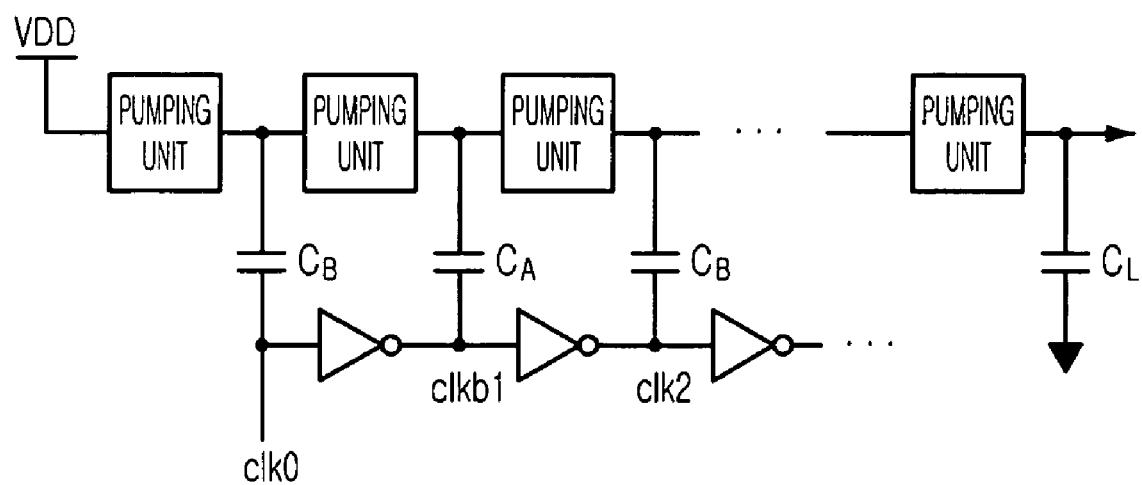
FIG. 6 is a block diagram showing a charge pump in accordance with another embodiment of the present invention.

FIG. 6 is a block diagram showing a charge pump in accordance with another embodiment of the present invention.

As shown, the charge pump includes at least one inverter coupled between the clock signal clk and the inverse clock signal clkb signal which drive the coupling capacitors, e.g., $C_B$ and $C_A$. For example, a first inverter is for inverting an clock signal clk0 to generate an inverse clock signal clkb1 in order to provide appropriate delays to avoid simultaneous switching of the transfer transistor M0 and the equalization transistor M6. If the clock signal clk rises and the inverse clock signal clkb falls at the same timing in FIG. 2, the equalization transistor M6 is first turned on and then the voltage of the gate node G goes up to that of the node B with a predetermined time. Then, the transfer transistor M0 is turned off by the increased gate voltage. Thus, there is a time slot in which the node B has a higher voltage level than the node A but still the gate voltage of the transfer transistor M0 is low enough to let the charge of the node B to flow to the node A. This reverse charge flow can lower the pumped voltage on node B, i.e., eventually lower the overall output voltage. This can be removed with sequential clocking with appropriate delay.

In FIG. 6, the number in the clock signal and the inverse clock signal denotes the transition sequence. The clock signal clk0 changes first, then the inverse clock signal clkb1 changes after one inverter delay and so on. During the transition of the transfer transistor M0 to the off-state, the inverse clock signal clk1 goes low and the node A changes first. Thus, the equalization transistor M6 is turned on and the gate goes high with a connection to the node B turning off the transfer transistor M0. After one inverter delay, the node B and the gate node move up still keeping the transfer transistor M0 off. Since the transfer transistor M0 is already off before the node B goes higher than the node A, no reverse current can flow.

The charge pump described in FIG. 6 can overcome some problems or limitations because of a minute manufacturing error or changes of a external circumstance. That is, in a case that the inverters are not included in the charge pump, inputted timings of the clock signal clk and the inverse clock signal clkb should be same. If the clock signal clk and the inverse clock signal clkb are not inputted at the same timing, a clock signal inputted to an output node at a predetermined pumping unit is changed faster than an inverse clock signal inputted to an input node at the predetermined pumping unit, or an inverse clock signal inputted to an output node at a predetermined pumping unit is changed faster than a clock signal inputted to an input node at the predetermined pumping unit. In this case, an output voltage is higher than an input voltage at the predetermined pumping unit; and, if a transfer transistor included in the predetermined pumping unit is turned on, the reverse current can be flow.

However, in the charge pump shown in FIG. 6, a signal, e.g., clk, (at an output node of a predetermined pumping unit) is inputted later than another signal, e.g., clkb, at an input node of the predetermined pumping unit. Namely, the clock signal clk or the inverse clock signal clkb inputted to the output node of the predetermined pumping unit should be transmitted through the inverter, i.e., be delayed for a predetermined time by the inverter. Therefore, the charge pump including the inverter can be prevent a reverse charge flow from the output node to the input node and the pumping efficiency of the charge pump is increased.

In the present invention, the pumping efficiency can be increased because a body bias effect is eliminated by using two additional MOS transistors included in the transfer block in accordance of the previous charge pump.

In addition, since the charge pump according to the present invention includes a diode block which keeps the gate voltage of transfer transistor lower than the pumped node by 2Vt, it can generate a output voltage without any degradation due to a threshold voltage of a MOS transistor inside the charge pump.

That is, in the charge pump according to the present invention, the pumping efficiency is advanced. Therefore, since the voltage drop of the output voltage can be prevented, the charge pump can be widely applied to portable or mobile system having a flash memory or a RAM with low VDD.

The present application contains subject matter related to Korean patent application No. 2004-37487, filed in the Korean Patent Office on May 25, 2004, the entire contents of which being incorporated herein by reference.

While the present invention has been described with respect to the particular embodiments, it will be apparent to those skilled in the art that various changes and modification may be made without departing from the spirit and scope of the invention as defined in the following claims.

What is claimed is:

1. An apparatus for amplifying an inputted voltage, comprising:
   pumping units to amplify the inputted voltage to generate an output voltage, each pumping unit including a transferring block to transmit the inputted voltage and an activation block to activate the transferring block which includes:
     a transfer transistor to receive the inputted voltage and transmit the inputted voltage in response to a voltage difference between a gate voltage and a source voltage of the transfer transistor; and
     an auxiliary transistor device which comprises two PMOS transistors to keep a voltage level at a body of the transfer transistor at a voltage level which is a higher voltage level of the source voltage and a drain voltage of the transfer transistor; and
   pumping capacitors, each coupled between each two pumping units to supply a charge to amplify the output voltage of each pumping unit.

2. The apparatus as recited in claim 1, wherein the activation block includes:
   a diode block for making the voltage difference between the gate voltage and the source voltage of the transfer transistor higher than a threshold voltage to remove voltage loss due to the threshold voltage of the transfer transistor; and
   a turn-off block for making the gate voltage of the transfer transistor equal to the drain voltage of the transfer transistor to inactivate the transferring block.

3. The apparatus as recited in claim 2, wherein the diode block includes:
   at least one diode for decreasing the gate voltage of the transfer transistor so that the threshold voltage is lower than the source voltage of the transfer transistor.

4. The apparatus as recited in claim 3, wherein the diode block includes two diodes.

5. The apparatus as recited in claim 4, wherein each diode includes a diode-connected PMOS transistor.

6. The apparatus as recited in claim 2, wherein the turn-off block includes:
   an equalization transistor having a gate, a source, a drain and a body, wherein the gate is coupled to the inputted voltage, the source is coupled to the gate of the transfer transistor and the drain and the body are coupled to the output voltage of the pumping unit.

7. The apparatus as recited in claim 2, wherein the activation block further includes:
   a discharge block for discharging charge accumulated by a parasitic capacitance of the transfer transistor.

8. The apparatus as recited in claim 7, wherein the discharge block includes:
   a bias block for supplying one of a supply voltage and a ground in response to an inputted signal;
   a delay block for delaying an output of the bias block by a predetermined time; and
   a control transistor coupled to a gate of the transfer transistor for discharging the accumulated charge by using the output of the bias block during the predetermined time.

9. The apparatus as recited in claim 8, wherein the inputted signal is one of a clock signal and an inverse clock signal.

10. The apparatus as recited in claim 8, wherein the delay block includes an even number of serially connected inverters.

11. The apparatus as recited in claim 1, wherein the pumping capacitors include:
    a first pumping capacitor coupled to a clock signal; and
    a second pumping capacitor coupled to an inverse clock signal.

12. The apparatus as recited in claim 11, wherein the clock signal and the inverse clock signal are respectively inputted from an outside of the apparatus for amplifying the inputted voltage.

13. The apparatus as recited in claim 11, further comprising at least one inverter for inverting one of the clock signal and the inverse clock signal to thereby generate one of the inverse clock signal and the clock signal.

14. The apparatus as recited in claim 13, wherein each inverter is coupled between every nth pumping capacitor and (n+1)th pumping capacitor to sequentially drive pumping capacitors.

15. The apparatus as recited in claim 13, further comprising: a bias capacitor coupled between ground and last pumping unit for stabilizing the output voltage of the last pumping unit.

* * * * *